US011774277B2

(12) United States Patent
Dieterle et al.

(10) Patent No.: US 11,774,277 B2
(45) Date of Patent: Oct. 3, 2023

(54) RADAR SENSOR FOR OBJECT DETECTION

(71) Applicant: VEGA Grieshaber KG, Wolfach (DE)

(72) Inventors: Levin Dieterle, Oberwolfach (DE); Roland Welle, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 322 days.

(21) Appl. No.: 17/262,331

(22) PCT Filed: Aug. 1, 2019

(86) PCT No.: PCT/EP2019/070758
§ 371 (c)(1),
(2) Date: Jan. 22, 2021

(87) PCT Pub. No.: WO2020/025744
PCT Pub. Date: Feb. 6, 2020

(65) Prior Publication Data
US 2021/0318159 A1    Oct. 14, 2021

(30) Foreign Application Priority Data

Aug. 2, 2018  (EP) .................................. 18187120.3

(51) Int. Cl.
*G01F 23/284* (2006.01)
*G01S 7/02* (2006.01)
(Continued)

(52) U.S. Cl.
CPC ............ *G01F 23/284* (2013.01); *G01S 7/003* (2013.01); *G01S 7/027* (2021.05); *H01Q 1/42* (2013.01); *H01Q 1/225* (2013.01)

(58) Field of Classification Search
CPC ........ G01F 23/284; H01Q 1/42; H01Q 1/225; G01S 7/027; G01S 7/003
See application file for complete search history.

(56) References Cited

U.S. PATENT DOCUMENTS

| 6,107,957 A * | 8/2000 | Cramer ................... G01S 13/38 |
| | | 342/124 |
| 6,462,717 B1 * | 10/2002 | Wheelock ................ H01Q 1/42 |
| | | 343/874 |

(Continued)

FOREIGN PATENT DOCUMENTS

| DE | 10 2006 032 250 A1 | 1/2008 | |
| DE | 102007057211 A1 * | 5/2009 | ............. B65D 51/24 |

(Continued)

OTHER PUBLICATIONS

International Search Report dated Oct. 16, 2019 in PCT/EP2019/070758 filed on Aug. 1, 2019, 3 pages.

(Continued)

*Primary Examiner* — Peter M Bythrow
(74) *Attorney, Agent, or Firm* — Oblon, McClelland, Maier & Neustadt, L.L.P.

(57) ABSTRACT

A radar sensor is provided, including sensor circuitry, electronic evaluation circuitry, communication circuitry, power supply circuitry, and a housing, the sensor circuitry being configured to emit and/or to receive a radar signal through the housing, the housing being configured such that the radar signal can be transmitted through the housing, the electronic evaluation circuitry being configured to detect an object based on the radar signal and/or to determine a distance between the radar sensor and the object, the electronic evaluation circuitry being further configured to determine at least one parameter representative of the detected object and/or of the determined distance, the communication circuitry being configured to wirelessly communicate the at least one parameter through the housing to a receiver, and the housing completely enclosing the sensor circuitry, the electronic evaluation circuitry, the power supply circuitry, and the communication circuitry.

15 Claims, 2 Drawing Sheets

(51) Int. Cl.
*G01S 7/00* (2006.01)
*H01Q 1/42* (2006.01)
*H01Q 1/22* (2006.01)

(56) References Cited

U.S. PATENT DOCUMENTS

| | | | | |
|---|---|---|---|---|
| 7,075,480 | B2* | 7/2006 | Fehrenbach | G01S 7/032 |
| | | | | 73/290 R |
| 7,852,271 | B2* | 12/2010 | Grunig | H01Q 1/42 |
| | | | | 343/702 |
| 8,269,666 | B2* | 9/2012 | Schultheiss | H01L 23/552 |
| | | | | 342/124 |
| 9,163,974 | B1* | 10/2015 | Kekäläinen | H05K 3/281 |
| 9,291,443 | B2* | 3/2016 | Kleman | G01F 23/284 |
| 10,247,406 | B2* | 4/2019 | Abbott | F21V 33/00 |
| 10,488,549 | B2* | 11/2019 | Kare | H01S 5/0085 |
| 11,047,725 | B2* | 6/2021 | Ohlsson | G01S 13/88 |
| 2005/0225480 | A1* | 10/2005 | Fehrenbach | G01S 7/032 |
| | | | | 73/290 R |
| 2008/0011287 | A1* | 1/2008 | Staiger | G01F 23/296 |
| | | | | 126/704 |
| 2008/0079641 | A1* | 4/2008 | Grunig | H01Q 1/24 |
| | | | | 343/702 |
| 2009/0126483 | A1* | 5/2009 | Blendinger | H02G 9/10 |
| | | | | 73/304 C |
| 2010/0101317 | A1* | 4/2010 | Ashrafzadeh | G01F 23/26 |
| | | | | 702/188 |
| 2012/0153969 | A1* | 6/2012 | Eckert | H01P 5/087 |
| | | | | 324/637 |
| 2014/0022106 | A1* | 1/2014 | Duvoisin | G01S 13/0209 |
| | | | | 342/22 |
| 2015/0253176 | A1* | 9/2015 | Jirskog | G01S 7/35 |
| | | | | 342/124 |
| 2016/0266240 | A1* | 9/2016 | Hughes | G01S 13/88 |
| 2016/0313156 | A1* | 10/2016 | Croft | G01S 13/88 |
| 2017/0167865 | A1* | 6/2017 | Welle | G01B 21/20 |
| 2017/0328997 | A1* | 11/2017 | Silverstein | G01S 13/765 |
| 2017/0370762 | A1* | 12/2017 | Karimian-Sichany | |
| | | | | G01S 13/10 |
| 2018/0238997 | A1* | 8/2018 | Turcotte | G01F 23/802 |
| 2018/0246200 | A1* | 8/2018 | Goossen | G01S 7/003 |
| 2018/0353086 | A1* | 12/2018 | Turner | G01S 7/41 |
| 2019/0101429 | A1* | 4/2019 | Kleman | G01F 23/284 |
| 2020/0039531 | A1* | 2/2020 | Fushimi | G01S 17/86 |

FOREIGN PATENT DOCUMENTS

| | | |
|---|---|---|
| EP | 1 493 003 A1 | 1/2005 |
| EP | 3 032 640 A1 | 6/2016 |
| RU | 2 610 047 C1 | 2/2017 |
| WO | WO 03/085365 A1 | 10/2003 |
| WO | WO 2013/064350 A1 | 5/2013 |
| WO | WO 2017/207529 A1 | 12/2017 |
| WO | WO 2019/091640 A1 | 5/2019 |

OTHER PUBLICATIONS

Combined Russian Office Action and Search Report dated Feb. 28, 2022 in Russian Patent Application No. 2021104609, 8 pages.
International Preliminary Report on Patentability and Written Opinion dated Feb. 11, 2021 in PCT/EP2019/070758, 16 pages.

* cited by examiner

RADAR SENSOR FOR OBJECT DETECTION

REFERENCE TO RELATED APPLICATIONS

This application claims priority of European Patent Application No. 18 187 120.3, filed Aug. 2, 2018, which is incorporated herein by reference in its entirety.

FIELD OF INVENTION

The invention relates to a radar sensor, the use of such a radar sensor, and a method of manufacturing such a radar sensor.

TECHNOLOGICAL BACKGROUND

Radar sensors can be used generally to detect an object and/or to determine a distance between the radar sensor and an object, such as based on a time-of-flight measurement.

In particular, radar sensors can be used as level measuring devices for determining a level of a medium, such as a medium in a container, and/or for determining a limit level of the medium. The medium can be, for example, a liquid and/or a bulk material. Radar-based level meters transmit radar signals to the product surface. The running time of the radar signal from the radar sensor to the product surface and back is proportional to the length of the distance covered, so that the level can be determined from the measured running time, knowing for example the position of the radar sensor and the vessel geometry.

In many applications, special measures must be taken for the safe and reliable operation of radar sensors, especially in the area of level measurement. For example, explosive gases can occur in plants of the chemical industry, which must preferably not come into contact with the electronics of the radar sensor. It may also be necessary to prevent corrosion of the radar sensor electronics by aggressive liquids or gases. Dust can also negatively affect the function of the radar sensor electronics.

To ensure the safe operation of radar sensors, the electronics of the radar sensor are usually protected by a housing. The housing includes openings for cable feedthroughs, in particular for the power supply and/or wired communication connections. The openings of the housing must be sealed in a complex manner to prevent dust, liquids or gases from entering the housing of the radar sensor. For this reason, complex manufacturing processes, which are sometimes associated with high manufacturing costs, have been necessary up to now for radar sensors to achieve a high international protection (IP) rating.

SUMMARY OF THE INVENTION

Embodiments of the invention can advantageously provide a radar sensor that is easy to manufacture, compact, and robust.

This achieved in particular by the subject matter of the independent patent claims. Further embodiments of the invention are incorporated in the dependent claims and the following description.

A first aspect of the invention relates to a radar sensor. The radar sensor may be generally configured to detect an object and/or to determine a distance between the radar sensor and an object. In particular, the radar sensor may be for measuring a level and/or a limit level of a product in a container. In this context, the radar sensor includes a sensor circuitry, an electronic evaluation circuitry, a communication circuitry, a power supply circuitry and a housing. The sensor circuitry is configured to emit and/or receive a radar signal through the housing, in particular through a housing wall and/or a housing wall of the housing, the housing being configured in such a way that the radar signal can be transmitted at least partially through the housing, in particular through the housing wall. In other words, the housing may be configured such that the radar signal can be at least partially radiated and/or received through the housing. The electronic evaluation circuitry is configured to detect an object based on the radar signal and/or to determine a distance between the radar sensor and an object. Furthermore, the evaluation circuitry is configured to determine at least one parameter representative of the detected object and/or of the determined distance. For example, the electronic evaluation circuitry can be configured to determine at least one parameter correlating with a filling level and/or a limit level of a medium (or object) based on a transit time and/or transit time measurement of the radar signal between emission and reception of the radar signal. The communication circuitry is configured to transmit and/or transfer the at least one parameter wirelessly through the housing to a receiver, for example in the form of a signal and/or measurement signal. In particular, the communication circuitry can be configured to transmit a measurement signal correlating with the at least one parameter and/or a measurement signal representative and/or indicative of the at least one parameter through the housing. The communication circuitry can also be configured to receive, for example, a control signal through the housing. The housing can therefore be configured such that the measurement signal and/or the control signal can be transmitted at least partially through the housing, the housing wall and/or the housing wall. The housing completely encloses the sensor circuitry, the electronic evaluation circuitry, the power supply circuitry and the communication circuitry.

In this way, a compact, robust, reliably operating and cost-effectively producible radar sensor can be provided in an advantageous manner. In particular, the housing can reliably and permanently protect all the electronics of the radar sensor from external influences, such as dust, moisture, gas, liquid or the like. For example, the radar sensor can achieve a high IP protection class, such as IP 68 and/or IP 69.

The sensor circuitry of the radar sensor is configured to emit and/or receive a radar signal through the housing, in particular through a housing wall of the housing. The radar signal can generally denote a transmit signal, which can be emitted by the radar sensor and/or the sensor circuitry in the direction of the object, for example in the direction of a medium and/or filling material, and a receive signal, which can be reflected at the object and received by the sensor circuitry. Similarly, the sensor circuitry may be arranged to radiate the transmitted signal in the direction of the object and to receive the received signal reflected at the object. For this purpose, the sensor circuitry may comprise an antenna. For example, a parabolic antenna, a horn antenna, a Cassegrain antenna, or a patch antenna may be used. The sensor circuitry may also comprise an antenna array, and/or the directivity of the antenna array may be adaptively adjustable, for example to achieve beam focusing.

The antenna of the sensor circuitry can be configured both to emit the radar signal and/or the transmit signal and to receive the radar signal and/or the receive signal reflected from the object, for example from the product surface. For this purpose, the sensor circuitry can, for example, have a transmit-receive switch (duplexer) which carries out the switchover between the temporally staggered transmit and receive processes. The transmit-receive switch may be implemented and/or configured, for example, to discriminate in time between the transmit signal and the receive signal. However, it is also possible that the sensor circuitry uses different antennas for transmitting and receiving the radar signal.

In the context of the present disclosure, the object may be any object in an environment of the radar sensor. The object may be static or movable. Also, the object and/or a geometry of the object may be time-variable. The object may generally be a solid object, such as a transport material, a vehicle, a bulk material, or any other object. Also, the object may denote any medium and/or filling material, such as a fluid or liquid medium.

The radar sensor can be configured to perform measurements periodically. For example, the radar sensor can be configured to measure the level and/or limit level of the product in the container at fixed times, for example periodically. Accordingly, the sensor circuitry may be arranged to emit the radar signal at fixed times, in particular periodically. The emitting and receiving of the radar signal may thus be periodically repeated. Alternatively, or in addition thereto, the radar sensor may be arranged to perform a measurement of the fill level and/or limit level in response to a request in this regard from another device, such as a control station or a user device. For example, a control signal can be received via the communication circuitry, and/or the radar sensor can perform a level measurement and/or limit level measurement in response to the control signal.

The electronic evaluation circuitry is configured to determine the at least one parameter based on the radar signal, for example based on the transit time and/or the transit time measurement between emission and reception of the radar signal. The at least one parameter can correlate, for example, with the fill level and/or the limit level. For this purpose, the electronic evaluation circuitry may use signals and/or data provided to it by the sensor circuitry. The electronic evaluation circuitry can also be configured to receive a signal from the sensor circuitry and/or the communication circuitry with which the electronic evaluation circuitry is triggered and/or caused to determine the at least one parameter.

The parameter determined by the electronic evaluation circuitry can, for example, be representative and/or indicative of the transit time between the emission of the radar signal and the reception of the radar signal reflected by the object, such as the product surface, of the presence of the object in the vicinity of the radar sensor, of a distance between the object and the radar sensor, of a filling level of a medium in a container, of a limit level of the medium, of reaching the limit level, and/or of exceeding a filling level or limit level.

For example, if the propagation speed of the radar signal in the medium between the radar sensor and the product surface is known, the distance between the radar sensor and the product surface can be calculated and/or determined from the running time of the radar signal. In many applications, this propagation speed can be approximated sufficiently accurately with the speed of light. The product height can be determined, for example, if the height of the radar sensor above the vessel bottom is known in advance. Since the radar signal is sometimes only partially reflected from the product surface, while another part of the radar signal propagates through the product, the level can also be measured by determining the time interval between receiving the part of the radar signal reflected from the product surface and receiving the part of the radar signal reflected from the vessel bottom.

To determine the transit times, the electronic evaluation circuitry can use both analog and digital signal processing methods. Accordingly, the electronic evaluation circuitry may include, for example, at least one amplifier, low-pass filter, frequency mixer, and/or band-pass filter for analog signal processing. Further, the electronic evaluation circuitry may include one or more analog-to-digital converters that sample and quantize analog signals. Furthermore, the electronic evaluation circuitry may include one or more processors for digital signal processing, for example, microprocessors, digital signal processors, and/or other processors with application specific instruction set processors (ASIPs). In addition, the electronic evaluation circuitry may include one or more dedicated memory devices for data and/or program code, in particular volatile or non-volatile memories. Furthermore, the electronic evaluation circuitry may include one or more application-specific integrated circuits (ASICs).

The communication circuitry of the radar sensor is configured to wirelessly transmit the at least one parameter through the housing and/or to transmit a measurement signal correlating with the at least one parameter and/or a measurement signal representative and/or indicative of the at least one parameter through the housing. For this purpose, the communication circuitry may in particular use known communication standards such as Bluetooth (for example Bluetooth Low Energy), ZigBee, Wi-Fi (for example W-Fi HaLow) or cellular mobile radio standards such as 2G, 3G or 4G (for example LTE Cat 0). The communication circuitry may also be arranged to provide an optical communication link. The communication circuitry may therefore have, for example, a Bluetooth module, an infrared module, and/or a WLAN module.

The communication circuitry can be configured to send a measured value and/or the measurement signal at fixed times, in particular periodically. The communication circuitry can also be configured to receive and process messages and/or control signals from other devices. For example, the communication circuitry may be arranged to receive and process a control signal with which another device requests a measured value for the level in the container. The communication circuitry may be arranged to trigger the sensor circuitry and/or the electronic evaluation circuitry to perform a measurement of the fill level and/or limit level in the container in response to the request or control signal from the other device. Furthermore, the communication circuitry can be configured to send the parameter, the measured value and/or the measurement signal determined by the electronic evaluation circuitry in response to the trigger in response to the request or the control signal of the other device.

The communication circuitry may further be arranged to receive and process a message or control signal from another device with which the other device communicates a measured value, for example a value measured by the other device for the level in the container. The communication circuitry may be arranged to correct the parameter determined by the electronic evaluation circuitry using the measured value received from the other device and/or to transmit the corrected parameter. The communication circuitry can also be configured to receive and/or send parameterization data for parameterizing the radar sensor.

Instead of or in addition to the communication circuitry, the radar sensor can have a display device, for example a liquid crystal display, via which a measured value, such as the measured value for the filling level, can be displayed.

The power supply circuitry of the radar sensor is configured to supply the sensor circuitry, the electronic evaluation circuitry and the communication circuitry at least partially with electrical energy. The power supply circuitry can have a battery for this purpose, whereby the battery can be replaceable or non-replaceable.

The housing of the radar sensor is configured to completely enclose, surround and/or encapsulate the sensor circuitry, the electronic evaluation circuitry, the power supply circuitry and the communication circuitry. In particular, the housing may have no openings for cable penetrations. The housing may include and/or form a closed interior space in which the sensor circuitry, the electronic evaluation circuitry, the power supply circuitry and the communication circuitry are arranged and/or accommodated. Due to the completely enclosing housing, the sensor circuitry, the electronic evaluation circuitry, the power supply circuitry and the communication circuitry can be reliably protected from dust, gases and liquids in the environment of the radar sensor. This can enable safe and reliable operation of the radar sensor. In particular, the radar sensor can be operated inside the container in which the level is to be measured. Alternatively, the radar sensor can be fitted into an opening of the container in which the filling material is located and/or operated outside the container.

The housing of the radar sensor is further configured in such a way that the radar signal, the transmit signal and/or the receive signal can be transmitted through the housing, in particular through a housing wall. As it were, the housing may be arranged, implemented and/or configured to enable the detection of the object, the measurement of the level and/or the limit level through the housing. For example, the housing may be made of a plastic, such as polyethylene (PE) and/or high density polyethylene (HDPE), which is substantially transparent to the radar signal emitted by the sensor circuitry. It is also possible that only a portion of the housing is transparent to the radar signal emitted by the sensor circuitry, and the sensor circuitry may be configured to propagate the radar signal through the transparent portion of the housing. Also, it may be provided that in at least a portion of the housing through which the radiating and receiving of the radar signal occurs, a thickness of the housing wall is selected such that the radar signal is not absorbed or is only slightly absorbed by the housing. A thickness and/or wall thickness of the housing wall can be approximately in a range of 1 mm to 5 mm to ensure sufficient mechanical stability. A thickness of the housing wall in the partial area may be less than a thickness of another partial area of the housing.

According to an embodiment, the housing is completely closed. Alternatively or additionally, the housing encloses the sensor circuitry, the electronic evaluation circuitry, the power supply circuitry and the communication circuitry hermetically, in particular dust-tight, watertight and/or airtight. For example, the housing of the radar sensor may be configured to achieve protection class IP68 and/or IP69, i.e., the housing of the radar sensor is dust-tight and provides protection against ingress of water even in the event of permanent submersion. In addition, the housing can be configured and/or constructed to prevent gases from entering the interior of the housing. This is relevant, for example, in chemical industry plants where explosive or corrosive gases may occur.

According to an embodiment, the radar sensor is completely wireless/cableless on the outside, towards the outside and/or on the outside. Alternatively or additionally, the housing includes no cable feed-through. This means that the radar sensor can be operated completely autonomously and without cables, at least temporarily. This also enables efficient and flexible mounting of the radar sensor on any container, for example on the outside or inside of the container. This can also significantly reduce the installation effort required to install the radar sensor.

For example, the radar sensor and/or the housing of the radar sensor can be attached, mounted and/or fastened to the outside of a container. Alternatively, the radar sensor may be attached, mounted, and/or affixed to the inside of a container. For example, the radar sensor may be attached to the outside or inside of a container wall, such as by means of an adhesive connection, a welded connection, a screw connection, and/or any other connection. Both when the radar sensor is mounted on the outside and when it is mounted on the inside, the radar sensor can be attached to a side wall of the container, to a container ceiling or to a container base. In principle, the container can have any geometry and any material, such as plastic and/or metal. In particular, the container can be an intermediate bulk container, also known as an IBC container.

If the radar sensor is mounted on the inside of the container, the radar sensor can, for example, be mounted inside the container on a container ceiling. In particular, the radar sensor or the housing can be welded and/or glued to the container ceiling. In this way, for example, an antenna and/or a lens of the radar sensor can be optimized for the actual measurement. Also, the radar sensor can thus not protrude from the outside of the container and/or be protected from mechanical stress and/or damage. The radar sensor can also be protected against theft in this way.

According to a further embodiment, the housing of the radar sensor is configured in such a way that it permanently encloses the sensor circuitry, the electronic evaluation circuitry, the power supply circuitry and the communication circuitry. In other words, the housing of the radar sensor can be configured in such a way that it cannot be opened. This prevents, in particular, aggressive gases or liquids from coming into contact with the sensor circuitry, the electronic evaluation circuitry, the power supply circuitry or the communication circuitry as a result of unintentional opening of the housing. The housing permanently enclosing the sensor circuitry, the electronic evaluation circuitry, the power supply circuitry and the communication circuitry therefore increases the safety and robustness of the radar sensor.

According to a further embodiment, the housing of the radar sensor is configured to effect a bundling of the radar signal emitted by the sensor circuitry and/or to bundle the radar signal. In particular, the material and/or the shape of the housing can be configured to achieve a desired directional characteristic of the radar sensor.

For example, the radar sensor housing may be configured so that the main lobe of the directivity pattern is narrower than a predetermined angle. Further, the radar sensor housing may be configured to have the side lobes weaker than the main lobe by a predetermined factor. Alternatively or additionally, the housing may be configured to maximize the amount of energy radiated via the main lobe. Strong bundling of the radiated radar signal can make it possible to reliably determine and/or detect the level and/or limit level even at low radar signal transmission powers. With a stronger bundling of the radiated radar signal, a reduction of the energy consumption can therefore be achieved. As a result, an extension of the service life and/or an operating life of the radar sensor can be achieved.

According to a further embodiment, the power supply circuitry includes an accumulator. Optionally, the power supply circuitry can have a charging circuitry for charging the accumulator. The accumulator can be used to supply the sensor circuitry, the electronic evaluation circuitry and the communication circuitry with electrical energy. By recharging the accumulator through the charging circuitry, the operating time of the radar sensor can be extended.

The power supply circuitry may also include a device for determining the state of charge of the accumulator. The radar sensor may be arranged to repeat the measurement of the level and/or limit level in the container after certain time intervals, the time interval depending on the state of charge of the accumulator. In particular, the sensor circuitry may be configured to emit the radar signal less frequently when the state of charge of the accumulator is low. Accordingly, the electronic evaluation circuitry may be arranged to determine the parameter correlating with the level and/or the limit level less frequently when the state of charge of the accumulator is low and/or reaches a definable or predetermined threshold of the. In addition, the communication circuitry can be configured to send the parameter and/or the measurement signal less frequently when the state of charge of the accumulator is low and/or reaches a definable or predetermined threshold of the.

According to a further embodiment, the charging circuitry of the power supply circuitry includes a solar cell and/or the housing of the radar sensor is configured to be translucent. For this purpose, at least part of the housing can be made, for example, of a light-transmitting plastic such as polyethylene or polypropylene. As a result, the operating time of the radar sensor can be increased in an advantageous manner and/or the radar sensor can be operated autonomously over a long period of time.

According to a further embodiment, the charging circuitry of the power supply circuitry includes a generator for generating electrical energy from vibrations. As a result, the operating time of the radar sensor can be increased in an advantageous manner and/or the radar sensor can be operated autonomously over a long period of time.

According to a further embodiment, the charging circuitry of the power supply circuitry comprises a receiver for wireless power transmission by means of electromagnetic induction. For example, the receiver for wireless power transmission can be compatible with the Qi standard. This enables efficient and safe charging of the energy supply circuitry without the need for a cable for energy transmission.

According to a further embodiment, the charging circuitry of the power supply circuitry includes a thermoelectric generator for generating electrical energy from spatial temperature differences. This can also advantageously increase the operating time of the radar sensor.

According to a further embodiment, the housing of the radar sensor is injection molded from plastic, for example in one piece. A housing injection molded from plastic can be particularly advantageous because it includes no joints at which different housing components are connected to one another and at which leaks could occur, especially if the housing is configured as a single piece. Overmolding the sensor circuitry, the electronic evaluation circuitry, the power supply circuitry and the communication circuitry to form a one-piece housing therefore results in particularly safe and robust radar sensors.

According to another embodiment, the housing of the radar sensor comprises. at least two housing components, wherein the at least two housing components are joined together by means of welding and/or bonding. For example, the housing can consist of two housing components which are glued together by means of a suitable adhesive and/or joined by means of ultrasonic welding, so that the joint consists of the melted material of the two housing components. Preferably, the at least two housing components are made of the same plastic, such as thermoplastic (for example polyethylene or polypropylene). Alternatively, the housing components may be made of different materials.

According to a further embodiment, the housing of the radar sensor is made entirely of a plastic, such as a thermoplastic. This enables cost-effective manufacture by means of injection molding. In particular, it is advantageous if the housing is made of a plastic with low relative permittivity (about 1.5-3 and/or 2-3), such as polyethylene or polypropylene. Since the measurement of the radar sensor is made through the housing, this reduces the ringing of the antenna, improves the received signal quality at close range, and thus reduces the blocking distance of the sensor. The blocking distance is the distance within which no or no reliable measurement/evaluation of the received signals is possible.

The present disclosure further relates to the use of a radar sensor, as described above and below, to detect an object and/or to detect a presence of an object in an environment of the radar sensor. The environment of the radar sensor may be generally defined and/or limited by a line of sight and/or range of the radar sensor. The object may be any object, such as a static or moving object. The object, a geometry of the object, a shape of the object, and/or a position of the object may be variable. Optionally, the radar sensor can be configured to determine a change or alteration of the object, its geometry, its shape, and/or its position.

For example, the radar sensor can be configured and/or used to detect an object in a storage facility. For this purpose, the radar sensor may be arranged, mounted and/or fixed to any structure, such as a wall and/or a ceiling of a storage facility. For example, the radar sensor may be arranged in a storage facility and may be arranged to detect and/or count one or more objects in the vicinity of the radar sensor. Alternatively or additionally, the radar sensor may be arranged and/or used to determine a stock level.

According to an embodiment, the radar sensor, as described above and below, may be arranged and/or used for counting objects in a vicinity of the radar sensor and/or for determining a number of objects in a vicinity of the radar sensor.

For example, the radar sensor can be configured to determine a stock level. The object or objects can thus be a storage item, such as a pallet with a storage material on it. For example, the radar sensor may determine the number of pallets located in the vicinity of the radar sensor in order to determine the stock level.

Alternatively or additionally, the radar sensor, as described above and below, can be configured and/or used to determine an open area in a vicinity of the radar sensor. This may enable comprehensive monitoring and/or determination of a storage condition, such as in a storage facility and/or warehouse.

The radar sensor can also be used, for example, to determine a fill level in a waste container, such as a bottle bank Also, the object can be a vehicle. For example, the radar sensor can be arranged, fastened and/or mounted in a parking garage, in a parking lot, in a garage and/or in an underground garage. In this case, the radar sensor can detect and/or count the vehicles located in the vicinity, the parked vehicles and/or the vehicles passing by the radar sensor. The radar sensor can also determine a number of free parking spaces in the vicinity of the radar sensor.

Alternatively or additionally, the radar sensor can be configured and/or used, for example, for counting and/or detecting trains. For example, the radar sensor can be mounted, arranged and/or fixed at a station and/or on a rail track.

Alternatively or additionally, the radar sensor, as described above and below, can be configured and/or used for detecting a moving object, in particular an object on a conveyor device and/or a conveyor belt. For example, the radar sensor may be arranged in the vicinity of a conveyor belt on which objects are arranged and move past the radar sensor. The objects may be any conveyed material, such as for an industrial manufacturing plant. The objects can also be packages and/or packets, for example, which can be detected and/or counted by the radar sensor.

In general, the radar sensor can therefore be advantageously employed and/or used in any areas of industry, including the process industry, process automation and/or automation technology.

The term automation technology is understood to mean a subfield of technology that includes all measures for the operation of machines and plants without the involvement of humans. One goal of the related process automation is to automate the interaction of individual components of a plant in the chemical, food, pharmaceutical, petroleum, paper, cement, shipping or mining industries. A wide range of sensors can be used for this purpose, which are configured in particular to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subfield of automation technology concerns logistics automation. With the help of distance and angle sensors, processes within a building or within an individual logistics facility are automated in the field of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, LEDs, 2D cameras or 3D cameras that measure distances according to the time-of-flight (ToF) principle can be used for this purpose.

Another subfield of automation technology concerns factory/production automation. Application cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the participation of humans. The sensors used in this process and the specific requirements with regard to measuring accuracy when detecting the position and size of an object are comparable to those in the previous example of logistics automation. Therefore, sensors based on optical measuring methods are usually also used on a large scale in the field of factory automation.

In the field of logistics automation, as well as in the field of factory automation and safety technology, optical sensors have dominated up to now. These are fast (fast filling processes with >=10 measurements/second) and inexpensive and can reliably determine the position and/or distance to an object due to the relatively easy focusable optical radiation, which is the basis of the measurement.

A second aspect of the invention relates to a method for manufacturing a radar sensor as described above and below. In a first step, a sensor circuitry, an electronic evaluation circuitry, a communication circuitry and a power supply circuitry are provided. In a further step, the sensor circuitry, the electronic evaluation circuitry, the communication circuitry, and the power supply circuitry of the radar sensor are completely overmolded with a plastic to form a housing in one-piece form, wherein the housing completely encloses the sensor circuitry, the electronic evaluation circuitry, the power supply circuitry, and the communication circuitry. A one-piece housing is particularly advantageous because it includes no joints of housing components where leaks can occur. Overmolding the sensor circuitry, the electronic evaluation circuitry, the power supply circuitry and the communication circuitry to form a one-piece housing therefore results in particularly safe and robust radar sensors.

Features, elements and/or functions of the radar sensor as described above and below may be features, elements and/or steps of the method for manufacturing the radar sensor as described above and below, and vice versa.

In the following, embodiments of the invention are described with reference to the figures.

Similar, similar-appearing, identical or identical-appearing elements in the figures are given similar or identical reference signs. The figures are merely schematic and not to scale.

DETAILED DESCRIPTION OF EXEMPLARY EMBODIMENTS

The following figure description refers primarily to the determination of a filling level using the radar sensor according to the invention. However, this is merely an exemplary, illustrative and non-limiting application and/or use of the radar sensor. The radar sensor may be generally arranged and/or used for detecting any object and/or a distance between the radar sensor and any object, as discussed in detail above.

Figure 1:
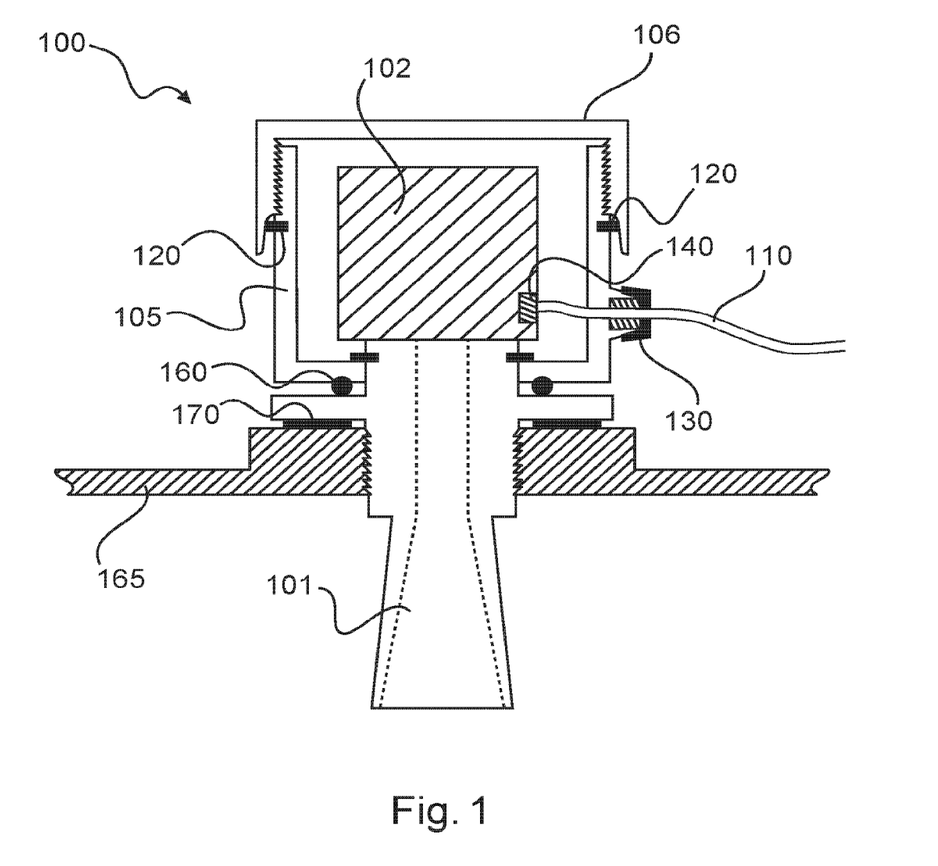
FIG. 1 schematically shows a radar sensor for measuring the level of a product in a container according to the state of the art.

FIG. 1 schematically shows a radar sensor 100 for measuring the level of a product in a container according to the state of the art. The radar sensor 100 includes an antenna 101, an electronics and evaluation circuitry 102, a housing 105, and a cover 106. The housing 105 includes a sealed cable feedthrough 130 through which a cable 110 can be passed to provide electrical power to the radar sensor 100 and or to provide a communication link. The cover 106, such as a screw cover, may be removed to connect the cable 110 to the connector 140. To protect the electronics and evaluation circuitry 102 of the radar sensor 100 from gases and or liquids, the housing 105 must be sealed. For this purpose, a seal 120 is provided for the cover 106. In addition, a seal is required on the cable gland 130. Since the antenna 101 and the housing 105 are usually made of different materials, another seal 160 is necessary. Another gasket 170 is required for sealing between the vessel flange 165 and the antenna. Thus, in the case of radar sensors for level measurement, several seals are required to protect the electronics and sensor circuitry from environmental influences and/or to seal an opening of the container for the radar sensor.

Figure 2:
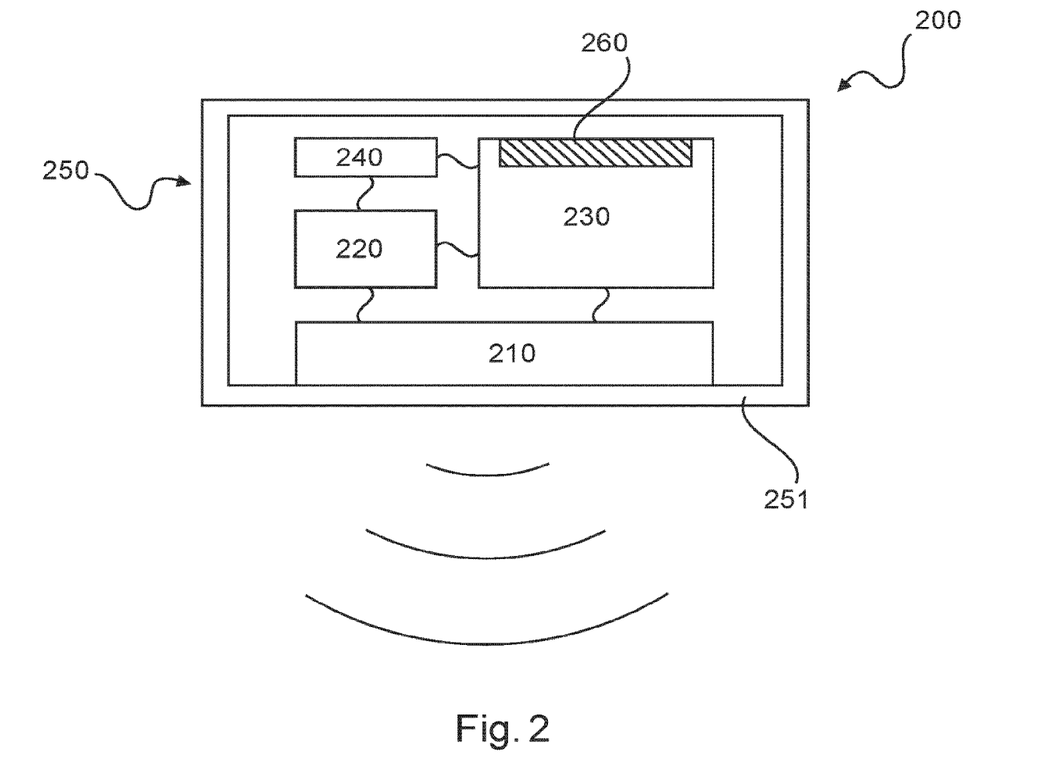
FIG. 2 schematically shows a radar sensor according to the invention for measuring the level of a product in a container.

FIG. 2 schematically shows a radar sensor 200 according to the invention for level measurement and/or point level measurement. The radar sensor 200 includes a sensor circuitry 210, an electronic evaluation circuitry 220 and a power supply circuitry 230.

The sensor circuitry 210 includes an antenna, which is schematically illustrated in FIG. 2 with the sensor circuitry 210, via which a radar signal is radiated and/or received by the housing 250, a housing wall 251 and/or a housing wall 251. The radar signal propagates to the surface of the filling material in the container, is partially reflected there and propagates back to the antenna of the sensor circuitry 210. The sensor circuitry 210 provides signals and/or data to the electronic evaluation circuitry 220, from which the electronic evaluation circuitry determines at least one parameter correlating with the filling level and/or the limit level based on the transit time between emission and reception of the radar signal.

The at least one parameter determined by the electronic evaluation circuitry 220 and/or a measured value correlating therewith is made available to a user via a communication circuitry 240. The communication circuitry 240 is configured to enable transmission of the parameter determined by the electronic evaluation circuitry 220 and/or the measured value, for example by means of radio, Bluetooth, WLAN, infrared and/or optical signals.

In addition, the radar sensor can also have a display device not shown, for example a liquid crystal display. Via the display device, the electronic evaluation circuitry can display a certain level of the filling material in the container.

The power supply circuitry 230 is configured to supply electrical power to the sensor circuitry 210, the electronic evaluation circuitry 220, and the communication circuitry 240.

The housing 250 completely encases and/or encloses the sensor circuitry 210, the electronic evaluation circuitry 220, the power supply circuitry 230, and the communication circuitry 240. In particular, the housing 250 may be configured to prevent dust, liquids or gases from entering the housing, making the radar sensor robust and safe, in particular against aggressive or explosive media. The measurement of the level and/or limit level is performed through the completely enclosing housing 250.

Due to the only finite capacity of the power supply circuitry 230, only a limited amount of power is available to the radar sensor 200 from the factory. To extend the life of the radar sensor 200, the power supply circuitry may include an accumulator and/or a charging circuitry 260, wherein the charging circuitry is configured to charge the accumulator. For example, the charging circuitry may comprise a receiver for wireless power transfers using electromagnetic induction, for example using the Qi standard. Alternatively or in addition, the charging circuitry may comprise a solar cell and/or a generator for generating electrical energy from vibrations. Furthermore, the charging circuitry may include a thermoelectric generator for extracting electrical energy from spatial temperature differences.

Figure 3:
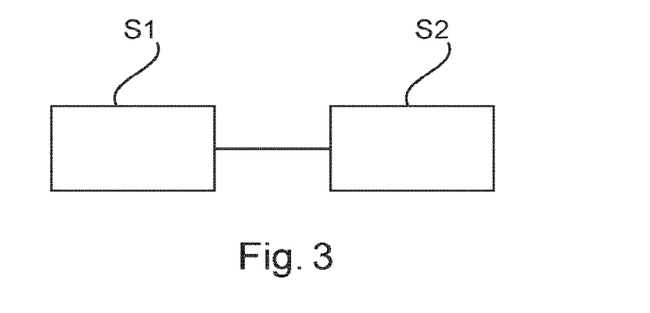
FIG. 3 shows a flowchart illustrating steps of a method for manufacturing a radar sensor according to an embodiment of the invention.

FIG. 3 shows a flowchart illustrating steps of a method for manufacturing a radar sensor 200 according to an embodiment of the invention. The radar sensor 200 may be approximately the radar sensor 200 described with reference to FIG. 2.

In a first step S1, a sensor circuitry 210, an electronic evaluation circuitry 220, a communication circuitry 240, and a power supply circuitry 230 are provided. In a further step S2, the sensor circuitry 210, the electronic evaluation circuitry 220, the communication circuitry 240, and the power supply circuitry 230 of the radar sensor are completely overmolded with a plastic to form a housing 250 in an integral form, so that the housing 250 completely encloses the sensor circuitry, the electronic evaluation circuitry, the power supply circuitry, and the communication circuitry.

Supplementally, it should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A radar sensor, comprising:
 a sensor circuitry, an electronic evaluation circuitry, a communication circuitry, a power supply circuitry, and a housing,
 wherein the sensor circuitry is configured to emit and/or to receive a radar signal through the housing,
 wherein the housing is configured such that the radar signal can be transmitted through the housing,
 wherein the electronic evaluation circuitry is configured to detect an object based on the radar signal and/or to determine a distance between the radar sensor and the object,
 wherein the electronic evaluation circuitry is further configured to determine at least one parameter representative of the detected object and/or of the determined distance,
 wherein the communication circuitry is configured to wirelessly communicate the at least one parameter through the housing to a receiver, and
 wherein the housing completely encloses the sensor circuitry, the electronic evaluation circuitry, the power supply circuitry, and the communication circuitry.

2. The radar sensor according to claim 1,
 wherein the housing is completely closed, and/or
 wherein the housing hermetically encloses the sensor circuitry, the electronic evaluation circuitry, the power supply circuitry, and the communication circuitry.

3. The radar sensor according to claim 1,
 wherein the radar sensor is completely wireless to an outside, and/or
 wherein the housing does not have a cable feed-through.

4. The radar sensor according to claim 1,
 wherein the housing is not openable.

5. The radar sensor according to claim 1,
 wherein the housing is further configured to cause the radar signal emitted by the sensor circuitry to be focused and/or to focus the radar signal.

6. The radar sensor according to claim 1,
 wherein the power supply circuitry comprises an accumulator, and/or
 wherein the power supply circuitry comprises a charging circuitry configured to charge an accumulator.

7. The radar sensor according to claim 6,
wherein the charging circuitry comprises a solar cell, and/or
wherein the housing is translucent.

8. The radar sensor according to claim 6,
wherein the charging circuitry comprises a generator configured to generate electrical energy from vibrations.

9. The radar sensor according to claim 6,
wherein the charging circuitry comprises a receiver configured for wireless power transmission by electromagnetic induction.

10. The radar sensor according to claim 6,
wherein the charging circuitry comprises a thermoelectric generator configured to generate electrical energy from spatial temperature differences.

11. The radar sensor according to claim 1,
wherein the housing is injection-molded from plastic material.

12. The radar sensor according to claim 1,
wherein the housing comprises at least two housing components, and
wherein the at least two housing components are joined by welding and/or bonding.

13. The radar sensor according to claim 1,
wherein the housing is made entirely of a plastic.

14. The radar sensor according to claim 1,
wherein a material of the housing includes a relative permittivity between 1.5 and 3.

15. A method of manufacturing a radar sensor, the method comprising:
providing a sensor circuitry, an electronic evaluation circuitry, a communication circuitry, and a power supply circuitry; and
completely encapsulating the sensor circuitry, the electronic evaluation circuitry, the communication circuitry, and the power supply circuitry with a plastic, forming a housing in one piece, so that the housing completely encloses the sensor circuitry, the electronic evaluation circuitry, the power supply circuitry, and the communication circuitry.

* * * * *